(12) United States Patent
O'Kell et al.

(10) Patent No.: US 10,981,498 B2
(45) Date of Patent: Apr. 20, 2021

(54) LED RETROFIT LIGHTING UNIT

(71) Applicant: Saf-T-Glo Limited, Wales (GB)

(72) Inventors: Sean O'Kell, Wales (GB); Robert Trundle, Wales (GB)

(73) Assignee: SAF-T-GLO LIMITED

( * ) Notice: Subject to any disclaimer, the term of this patent is extended or adjusted under 35 U.S.C. 154(b) by 3 days.

(21) Appl. No.: 16/462,102

(22) PCT Filed: Nov. 16, 2017

(86) PCT No.: PCT/GB2017/053452
§ 371 (c)(1),
(2) Date: May 17, 2019

(87) PCT Pub. No.: WO2018/091900
PCT Pub. Date: May 24, 2018

(65) Prior Publication Data
US 2020/0275540 A1 Aug. 27, 2020

(30) Foreign Application Priority Data

Nov. 18, 2016 (GB) .................................. 1619563
Nov. 18, 2016 (GB) .................................. 1619564
(Continued)

(51) Int. Cl.
*B60Q 3/44* (2017.01)
*H05B 45/35* (2020.01)
(Continued)

(52) U.S. Cl.
CPC ............ *B60Q 3/43* (2017.02); *B60Q 3/44* (2017.02); *B60Q 3/47* (2017.02); *B60Q 3/60* (2017.02);
(Continued)

(58) Field of Classification Search
None
See application file for complete search history.

(56) References Cited

U.S. PATENT DOCUMENTS 5,070,434 A 12/1991 Suman
5,377,087 A 12/1994 Yoon
(Continued)

FOREIGN PATENT DOCUMENTS

EP 2076095 7/2009
EP 2 110 282 10/2009
(Continued)

OTHER PUBLICATIONS

International Search Report re PCT/GB2017/053452 dated Apr. 13, 2018; 2 pages.
(Continued)

*Primary Examiner* — Dedei K Hammond
(74) *Attorney, Agent, or Firm* — Foley & Lardner LLP

(57) ABSTRACT

An LED lighting assembly (1) comprising a cassette (2), a lens, a printed circuit board, PCB, (6) having at least one LED light source mounted thereon, the lighting assembly comprising an LED driver circuit arranged to maintain conduction in the circuit, the PCB using a first amount of power and wherein the LED driver circuit is arranged to simulate use of a second amount of power, the second amount being lower than the first amount. The LED lighting assembly comprises a capacitor arranged to be activated when a voltage across the LED driver circuit is below a first predetermined level. A resistor or resistor/capacitor combination is connectable to a trickle sensor in a passenger service unit (PSU).

8 Claims, 5 Drawing Sheets

(30) Foreign Application Priority Data

Nov. 18, 2016 (GB) .................................... 1619566
Nov. 18, 2016 (GB) .................................... 1619567

(51) Int. Cl.

| | | |
|---|---|---|
| *B60Q 3/43* | (2017.01) | |
| *B60Q 3/47* | (2017.01) | |
| *B60Q 3/60* | (2017.01) | |
| *B64D 11/00* | (2006.01) | |
| *F21V 14/06* | (2006.01) | |
| *F21K 9/238* | (2016.01) | |
| *F21V 3/10* | (2018.01) | |
| *F21V 5/00* | (2018.01) | |
| *F21V 9/08* | (2018.01) | |
| *H05B 45/50* | (2020.01) | |
| *H05B 45/345* | (2020.01) | |
| *F21Y 115/10* | (2016.01) | |
| *F21W 107/30* | (2018.01) | |
| *F21W 106/00* | (2018.01) | |

(52) U.S. Cl.
CPC .............. *B64D 11/00* (2013.01); *F21K 9/238* (2016.08); *F21V 3/10* (2018.02); *F21V 5/004* (2013.01); *F21V 9/08* (2013.01); *F21V 14/06* (2013.01); *H05B 45/345* (2020.01); *H05B 45/50* (2020.01); *B64D 2011/0038* (2013.01); *B64D 2011/0053* (2013.01); *B64D 2203/00* (2013.01); *F21W 2106/00* (2018.01); *F21W 2107/30* (2018.01); *F21Y 2115/10* (2016.08)

(56) References Cited

U.S. PATENT DOCUMENTS

| | | |
|---|---|---|
| 5,404,297 A | 4/1995 | Birk |
| 5,560,707 A | 10/1996 | Neer |
| 7,434,962 B2 | 10/2008 | Stache |
| 8,132,943 B2 | 3/2012 | Wang |
| 2002/0145871 A1 | 10/2002 | Yoda |
| 2005/0122062 A1 | 6/2005 | Hsu |
| 2008/0074889 A1 | 3/2008 | Gloisten et al. |
| 2008/0309257 A1 | 12/2008 | Hickey |
| 2009/0103296 A1 | 4/2009 | Harbers et al. |
| 2009/0121238 A1 | 5/2009 | Peck |
| 2009/0167186 A1* | 7/2009 | Ghanem ............... B61L 5/1827 315/77 |
| 2009/0167190 A1* | 7/2009 | Hickey .................. H05B 47/20 315/129 |
| 2009/0262538 A1 | 10/2009 | Ono |
| 2010/0127637 A1 | 5/2010 | Alexander |
| 2012/0087142 A1 | 4/2012 | Schultheis |
| 2013/0208473 A1 | 8/2013 | Palagashvili et al. |

FOREIGN PATENT DOCUMENTS

| | | |
|---|---|---|
| EP | 2 915 700 | 9/2015 |
| JP | 2005-149790 | 6/2005 |
| WO | WO-2009/059097 | 5/2009 |
| WO | WO-2010/059647 | 5/2010 |
| WO | WO-2010/063534 | 6/2010 |
| WO | WO-2012/032455 A1 | 3/2012 |
| WO | WO2016/162694 | 10/2016 |

OTHER PUBLICATIONS

International Search Report re PCT/GB2017/053454 dated Mar. 2, 2018; 3 pages.
International Search Report re PCT/GB2017/053541 dated Sep. 5, 2018; 5 pages.
Search Report regarding Appl. No. GB 161 9563.8, dated May 17, 2017, 3 pps.
Search Report for GB1619567 dated May 17, 2017 3 pages.

* cited by examiner

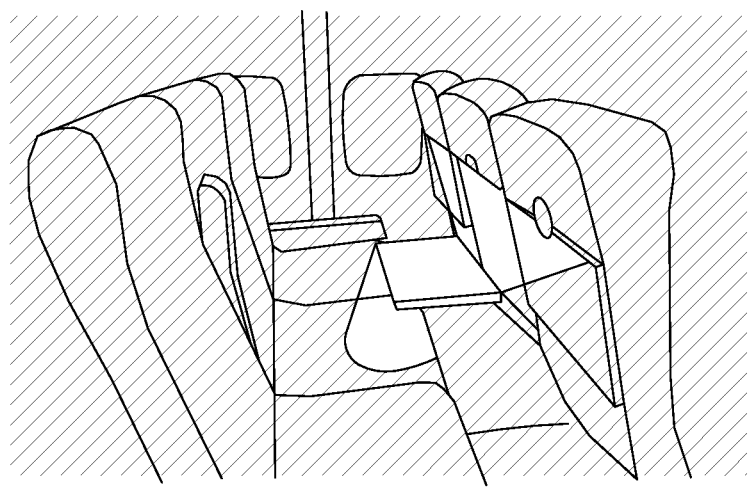
Figure 8
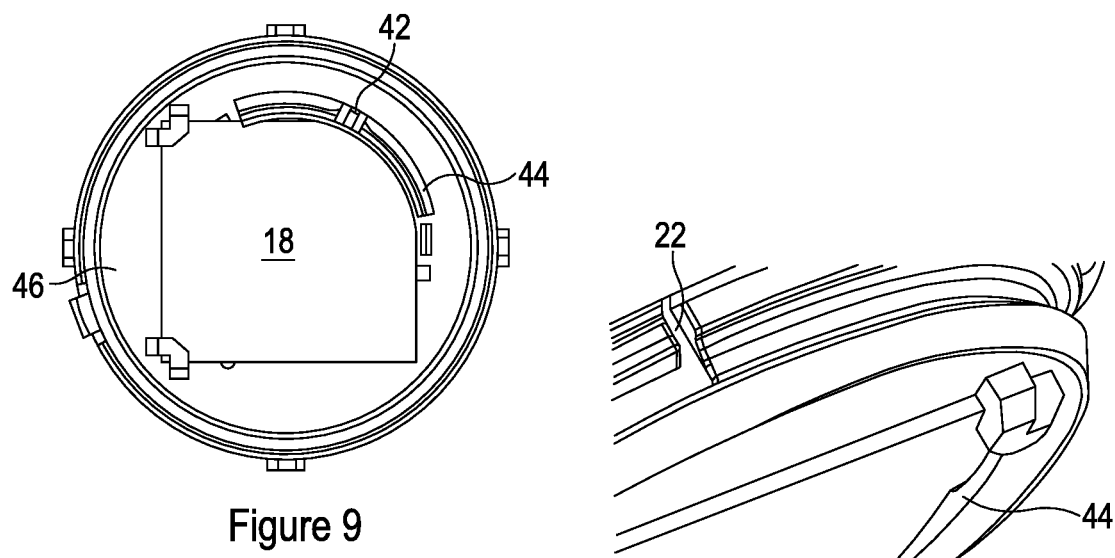
Figure 9
Figure 10
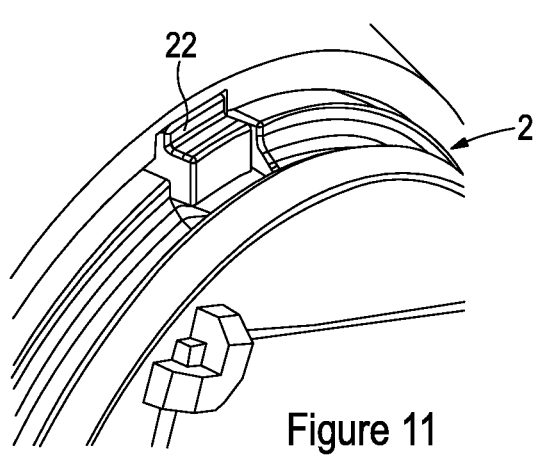
Figure 11

LED RETROFIT LIGHTING UNIT

CROSS-REFERENCE TO RELATED PATENT APPLICATIONS

The present application is a US National Stage of International Application No. PCT/GB2017/053452, filed Nov. 16, 2017, which claims priority to and the benefit of the following four applications: United Kingdom Application GB1619566.1, filed Nov. 18, 2016; United Kingdom Application GB1619563.8, filed Nov. 18, 2016; United Kingdom Application GB1619564.6, filed Nov. 18, 2016; United Kingdom Priority Application GB1619567.9, filed Nov. 18, 2016. Each of the aforementioned applications is hereby incorporated by reference in their entireties, including the specifications, drawings, claims and abstracts.

BACKGROUND

This invention relates to lighting units and in particular to lighting units for passenger vehicles.

Passenger vehicles such as aircraft, trains, coaches and ships are known to provide an overhead unit which typically includes a reading light. Typically, in an aircraft such reading lights are provided in a passenger service unit which typically includes a passenger air supply device and controls, oxygen masks and attendant call lights. The assembly is provided by the manufacturer and installed in the aircraft as a unit.

Existing passenger service units typically include a halogen or an incandescent reading light. More recent passenger service units may include an LED lighting unit. Existing incandescent or halogen reading lights have a number of undesirable features. Halogen lamps typically have a colour temperature of <3000 kelvin which is undesirable due to the amber colour and lack of ability to modify the colour output. Halogen lamps use a large amount of energy to produce the light which is undesirable in an aircraft due to limited energy supply. Furthermore, halogen lamps have proven to be unreliable in use which can cause passengers inconvenience in travel and adds to maintenance costs.

It will be appreciated that in new passenger service units, an LED lighting unit can be incorporated. However, it is desirable to replace the incandescent or halogen lighting units of existing passenger service units to utilise an LED light. Retrofitting an LED light has been previously described but it requires adaptation of the passenger service unit

BRIEF DESCRIPTION OF THE DRAWINGS

The invention will now be described by way of example only with reference to the accompanying drawings in which:

FIG. 8 is a schematic view of an LED light assembly defining a passenger space;

FIG. 9 is an end view of the cassette;

FIG. 10 is an enlarged view of a portion of the cassette;

FIG. 11 is a detailed view of a portion of the cassette; and

DETAILED DESCRIPTION

Figure 1:
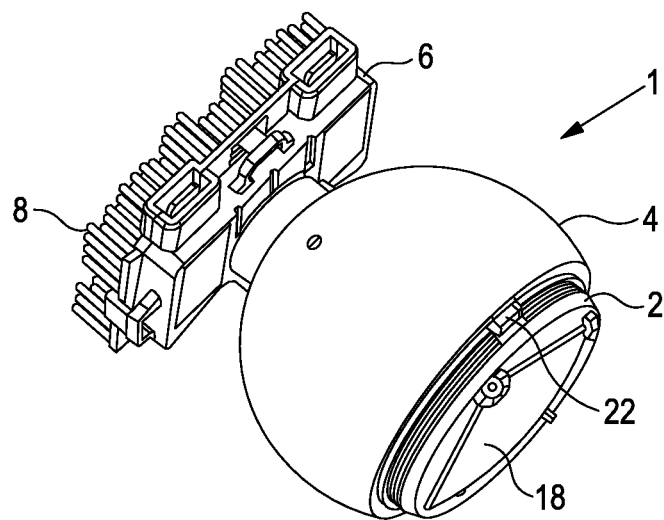
FIG. 1 is a perspective view of an LED reading light assembly in accordance with the invention.
Figure 1A:
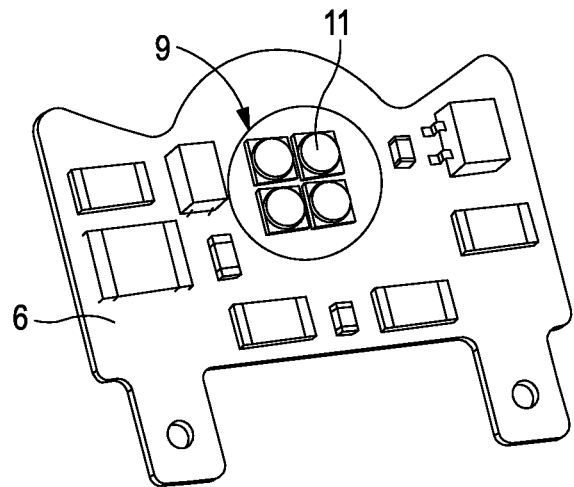
FIG. 1A shows the printed circuit board (PCB) with the LEDs.

It is an object of the present invention to provide a simple, effective method of retrofitting an LED light to a passenger service unit having an incandescent or halogen light fitting.

A further object of the invention is to provide improved passenger lighting, particularly in an aeroplane.

Another object of the invention is to provide an improved arrangement for providing a controlled light pattern.

An additional object is to improve control of the temperature of a light output means.

Another object of the invention is to provide an improved light fitting.

According to a first aspect of the invention there is provided an LED lighting assembly comprising a cassette, a lens, a printed circuit board having at least one LED light source mounted thereon wherein the lighting assembly comprises a collimator provided between the LED light source and the lens/aperture arrangement.

Preferably the collimator and lens are arranged to provide a uniform light intensity over a surface on which light from the LED lighting assembly is projected in use.

Desirably the collimator comprises an Optical Cavity. Light may enter the Optical Cavity from the one or more LED sources. Desirably the optical cavity conducts light and heat away from the LED. The Optical Cavity may be generally linear. The or each wall of the Optical Cavity may comprise a reflective surface. The reflective surface preferably comprises materials with a reflectance of >60%. In some embodiments the reflective surface comprises a diffuse reflector film.

The reflective surface may alternatively comprise a mix of photo luminescent material and reflective material to provide an additional night light, emergency lighting or other lighting function. The reflective surface may alternatively comprise a mix of an active filter/emitter surface and or a reflective material to modify the lighting function.

The or each light source is at least one and preferably more LEDs arranged on the printed circuit board (PCB). There may be 1, 2, 3, 4 or more LED light sources. In a preferred embodiment the lighting assembly comprises 4 LEDs. Desirably the LED light are arranged in rows. The LEDs may be arranged to be in two rows of two LEDs. It will be appreciated that in some embodiments 9 LED light sources may be used. The LEDs may be arranged in three rows of three LEDs.

Desirably the Optical Cavity is arranged to extend from a first side of the PCB.

Transfer of heat from the LEDs has been found to reduce an operating temperature of the LEDs. It will be appreciated that a reduction in the operating temperature increases the life span of the LEDs and increases reliability.

In a preferred embodiment the lens and aperture arrangement is spaced from the LED light source by the collimator. Spacing of the lens from the LED light source advantageously separates the lens from heat produced by the LEDs and from heat produced by the PCB so reducing localised heating of the lens. It has been found that localised heating of the focusing lens can cause discolouration and cracking.

In a preferred embodiment 4 LEDs are used. Advantageously the LED light sources may be selected to have red, green or blue (RGB) or white light outputs. Preferably the light output may be selected to be one of red, green, blue, white or a combination. In some embodiments the output of the LEDs may be selected to control a colour light output from the light assembly.

Advantageously the light output from the LEDs travels along the collimator becoming more linear. Desirably the output from the LEDs mix as the light travels along the linear collimator.

The lens may comprise an assembly having one or more focusing lenses. Advantageously the lens assembly further comprises a lens holder. The lens holder may be arranged to support the or each focusing lenses. Desirably the lens assembly further comprises an aperture arrangement. The aperture may be provided as a part of the lens holder. In some embodiments the aperture may be an integral part of the lens holder. The aperture may be fixed or adjustable. The aperture may be bevelled. Preferably the aperture is substantially square but may consist of any geometric shape. The lens assembly may also desirably comprise a diffuser. Preferably the aperture arrangement is spaced from the LED light source by the collimator.

Light passing from the collimator may be focused by the focusing lens and may then be shaped on passing through the aperture. In a preferred embodiment the aperture is substantially square or rectangular but may consist of any geometric shape. Light from the light assembly forms a square or rectangular light pattern. Desirably the focusing lens is arranged to generally focus the light such that light from the light assembly does not spill over into an adjacent passenger space. Advantageously the light pattern is evenly illuminated. Preferably the light pattern is evenly illuminated over a whole of the projected light pattern.

Use of a bevelled aperture has advantageously been found to soften a perceived edge of the light pattern. A particular advantage of a softened edge to the light pattern is that passenger perception of vibration of the light pattern due to aircraft vibration is less obvious. It has been found that a hard edge to the light pattern can induce a feeling of nausea in a passenger due to the perceived motion of the light pattern.

Advantageously the diffuser is placed between the collimator and the aperture. The diffuser also reduces the hard edge of the light pattern. A diffuser is a device that spreads the light from a light source evenly to create a more uniform intensity. The diffuser can comprise one or more of:

an optical component, such as a ground glass diffuser; teflon diffuser; holographic diffuser; opal glass diffuser; and greyed glass diffuser;

a filter;

a light enhancing film a photo luminescent film;

a phosphor film;

a temperature/electrically active film, or a transparent support film.

In some embodiments the aperture or the diffuser may be provided with a means of providing a soft start to intensity of the light pattern. In other embodiments a welcome logo or message may be provided when the reading light is turned on. The aperture or the diffuser may be provided with a film having a temperature sensitive coating such that the coating becomes completely or partially transparent as the temperature increases. An exemplary coating is using a temperature sensitive pigment such as a liquid crystal thermochromic ink. Alternatively, the film may comprise a pattern sensitive to an electrical voltage applied across the diffuser. An example of an electrically conductive film is an indium tin oxide (ITO) coating.

According to a second aspect of the invention there is provided a method of retrofitting an LED light assembly in accordance with the first aspect of the invention to a passenger vehicle the method comprising removing an incandescent or halogen bulb and front glass from a reading light unit in a passenger service unit, inserting the PCB with the or each LED light source into the passenger service unit and inserting the cassette into the reading light unit and connecting the cassette to the PCB.

Preferably the or each LED bulb or bulbs are located on a first side of a printed circuit board (PCB). A heat sink may be located on a second side of the PCB opposing the first side. Advantageously the PCB can be inserted from a rear side of the passenger service unit. It will be appreciated that fitting the PCB unit from the rear of the passenger service unit is easier to do when retrofitting an LED unit to an aircraft.

The collimator and the lens assembly are provided in the cassette. Preferably the cassette comprises a globe. Advantageously the globe is arranged to be compatible with existing reading light units and interchangeable with existing halogen or incandescent reading lights.

According to another aspect of the invention there is provided an LED lighting assembly comprising a cassette, a lens, a printed circuit board having at least one LED bulb mounted thereon wherein the lighting assembly comprises a light output from the or each LED bulb and wherein the light output is arranged to pass through a bevelled aperture.

Desirably the LED lighting assembly is arranged to provide a predetermined light pattern defining a personal passenger space. In some embodiments the light pattern is non-circular and may optionally be a square or a rectangle or a squircle.

Preferably the lighting assembly further comprises a diffuser. In a preferred embodiment the lens comprises a focusing lens or a focusing lens assembly. The focusing lens or assembly and the diffuser may be supported on a lens holder. The lens holder may further comprise the bevelled aperture.

An advantage of the bevelled aperture is that the edges of the light pattern are softened. As referred to above, hard edges have been found to induce nausea due to vibration of the air plane and consequent vibration of the edges of the predetermined light pattern. In a preferred embodiment the diffuser softens the edges of the light pattern further.

Desirably the aperture is non-circular. In one embodiment the aperture is selected from one of square, rectangular and a squircle. A squircle is a mathematical shape with properties between those of a square and those of a circle. Preferably the LED lighting assembly provides a light pattern that is a non-circular light pattern. Optionally the light pattern is a partially quadrilateral shaped light pattern. Advantageously such a light pattern defines a passenger space. In a preferred embodiment the predetermined light pattern does not spill over into an adjacent passenger space. Desirably the light is uniformly distributed within the desired light pattern.

Preferably the PCB is arranged to have an electrical connector and may be arranged to connect to an electrical power supply in the passenger service unit. The connection of the PCB to the electrical power supply may be conventional.

Preferably the electrical connector can be readily connected to the existing power supply unit in the passenger service unit. Advantageously, no replacement of the existing power supply unit or wiring is required to retrofit the LED lighting assembly to an existing reading light unit in a passenger vehicle such as an aeroplane. An advantage of the present invention is that the existing reading light unit is re-used.

According to another aspect of the invention there is provided an LED lighting assembly arranged to produce a predetermined non-circular light pattern wherein the LED lighting assembly comprises a cassette, a lens, a printed circuit board having at least one LED mounted thereon wherein the lighting assembly further comprises a lens holder arranged to support the lens and wherein the lens holder is arranged to be rotatable.

In a preferred embodiment the lens holder further comprises an aperture. Optionally the aperture is arranged to be non-circular. In a preferred embodiment the aperture is integral with the lens holder.

Desirably the lens holder can be rotated such that the orientation of the aperture is rotated. It is desirable that once the cassette and lens holder has been inserted into the passenger service unit the lens holder can be rotated to align the predetermined light pattern relative to the passenger space.

In some embodiments the cassette and lens holder are connected. Optionally the cassette and the lens holder are arranged to rotate together.

In a preferred embodiment the lens holder is arranged to rotate relative to the cassette. The lens holder may be provided with an arm extending through a slot in the cassette. The arm may be engaged by a fitter and rotated within the slot to align the aperture and the predetermined light pattern relative to the passenger space.

The slot may be arranged to extend around a circumference of the cassette. In other embodiments the slot may extend for a portion of an arc around the circumference of the cassette. The slot provides for adjustment of the orientation of the aperture from 0° to 360°. Preferably the slot is arranged to extend from 30° to 270° or most preferably from 50° to 150°.

According to another aspect of the invention there is provided an LED lighting assembly comprising a cassette, a lens, a printed circuit board having at least one LED mounted thereon wherein the lighting assembly comprises a rotatable lens holder and wherein a tamper proof fitting is securable to the cassette to secure the cassette in position in use and wherein the tamper proof fitting secures the rotatable lens holder relative to the cassette.

Preferably the tamper proof fitting is used to secure the arm in position in the cassette.

Preferably once the cassette has been secured in place in the reading light unit of the passenger service unit a tamper proof fitting can be fixed to the cassette. Desirably the tamper proof fitting is arranged to secure the arm in position relative to the cassette. Advantageously once the tamper proof fitting has been fixed the orientation of the lens assembly cannot be adjusted and the predetermined light pattern remains correctly orientated relative to the passenger space. Preferably the cassette cannot be removed from the reading light unit once the tamper proof fitting has been fixed. In a preferred embodiment the tamper proof fitting comprises a ring. Desirably the ring is arranged to be fitted to the cassette.

An advantage of the present invention is that LED lighting assembly comprises the PCB board and the cassette. The PCB board can be readily fitted to a passenger service unit from the rear of the passenger service unit. The cassette can be readily fitted to the passenger service unit without requiring any specialist skill. Retrofitting of the LED lights can be readily carried out without requiring specialist service personnel. In some cases, it may be possible to carry out a replacement programme on an ad hoc basis replacing existing halogen lights as the bulbs fail.

Another feature of the invention is that the LED lighting assembly comprises a lens which is arranged to provide a predetermined light pattern defining a personal passenger space. In some embodiments a diaphragm may be used to further control a light pattern from the light assembly. A reduced diaphragm may be used to reduce an overall size of a light pattern at specified distance.

Alternatively, in a preferred embodiment the focusing lens or lens assembly may be used to focus the light at a correct distance from the bulkhead.

Desirably the LED is arranged to provide a colour temperature of from 2000 kelvin to 10 000 kelvin and preferably from 3000 kelvin to 7000 kelvin and more preferably from 3500 kelvin to 5000 kelvin. In some cases, the colour temperature can be selected to suit a desired lighting situation. Different colour temperatures may be selected depending on other factors such as whether the light is providing mood lighting; night time lighting or a reading light. In a preferred embodiment the colour temperature is greater than 3000 kelvin and less than 4500 kelvin and in a particularly preferred range greater than 3500 kelvin and less than 4200 kelvin. Desirably the light source will have an R9 greater than 40, in a preferred embodiment this will be greater than 50 and most preferably greater than 70. The R9 value is an indicator of how well red tones are rendered. It is desirable that the R9 value is greater than 70 in order to improve colour rendition and reading conditions. A colour temperature between 3000 kelvin and 4500 kelvin and preferably between 3500 kelvin and 4200 kelvin also provides comfortable reading conditions It is well known that LED lighting has other advantages in that the heat output is much lower than the heat output of incandescent or halogen lights. The use of LED lights reduces the impact of lighting on the environmental temperature. Additionally, the heat output to the passenger service unit is also reduced so improving the safety of the passenger service unit. The power used by LED lights is much less than the power required by halogen lights and the LED light units are more reliable.

According to an aspect of the invention there is provided an LED lighting assembly having all of the features of claim 1 of the appended claims.

The LED lighting assembly comprises a cassette, a lens, a printed circuit board (PCB) having at least one LED light source mounted thereon the lighting assembly comprising an LED driver circuit arranged to maintain conduction in the circuit, the PCB using a first amount of power and wherein the PCB driver circuit is arranged to simulate use of a second amount of power, the second amount being lower than the first amount.

According to another aspect of the invention there is provided an LED lighting assembly adapted to be connected to a Passenger Service Unit (PSU) in use the LED lighting assembly comprising a cassette, a lens, a printed circuit board having at least one LED mounted thereon wherein the lighting assembly comprises an LED driver arranged to 1 provide a trickle current path when the LED is OFF, and
  2 maintain conduction in the passenger service unit when the LED is ON.

The LED lighting assembly is able to overcome the PSU safety features by providing a trickle current path when OFF such that the PSU fault setting is not triggered and a power supply from the PSU is maintained so that the LED lighting assembly has a power supply when the LED light is turned ON.

In some aircraft there are two different Passenger Service Unit control circuits in service that use different mechanisms for creating and controlling these two safety features. The Reading Light circuit has been designed to accommodate both these features It has been found that use of LEDs instead of halogen light bulbs causes a problem in that the current used by the LED light sources is much lower than the current used by a halogen or incandescent light bulb. The passenger service unit is typically provided with a controller connected to a sensor arranged to monitor power used in the passenger service unit. Typically, if the power used reduces below a predetermined level the controller is arranged to stop supply of power to the passenger service unit in order to save power and for safety reasons if the units in the PSU are not in active use by a passenger.

An unexpected problem that arises with retrofitting an LED lighting assembly is that the power used is much lower that the power used by halogen or incandescent bulbs and the controller may sense that the power being used by the passenger service unit is below the predetermined level. It has been found that this can cause LED reading lights to be turned OFF even when the reading light is on because the current used and hence the power used is below a predetermined threshold. The controller may cut off the power supply to the passenger service unit.

Advantageously, when the LED light is ON the PCB driver is arranged to simulate a higher and continuous power use. The sensor may detect the simulated higher power use. Advantageously the controller may be caused to maintain power to the passenger service unit as the PCB driver is arranged to draw a trickle current when the LED light is OFF.

The PCB may use a first amount of power when the LED is ON. Preferably the PCB driver circuit is arranged to simulate use of a second amount of power when the LED is OFF. Desirably the second amount of power is lower than the first amount of power.

Preferably the PCB is arranged to provide a return path for a trickle current sensor in the PSU. The detection of a trickle current provides and output to the controller in the PSU that a bulb is connected and the fault setting is not triggered. As referred to above some aircraft have a DC supply and others an AC supply. The PCB may be provided with a resistor across the reading light supply terminals for a PSU with a DC supply. The PCB may be provided with a resistor/capacitor combination across the reading light supply terminals for an AC Trickle sensor.

During operation when the reading light is ON the PSU will drop out if the instantaneous current falls below a value that maintains the PSU output circuit in conduction. It has been found that the instantaneous current will fall below the value required to maintain the PSU output circuit in conduction as the AC voltage cycle falls and an instantaneous voltage across the LED lighting assembly falls below that required to maintain conduction in the LED of the lighting assembly.

The PCB driver circuit uses the resistor/capacitor (RC) arrangement across the LED lighting assembly supply terminals to provide continuous current flow even when the applied voltage is too low to operate the LEDs directly.

Desirably the PCB driver is also arranged to allow the LED lighting assembly to be supplied by an AC or a DC supply. Preferably the drive circuit comprises a rectifier and an RC network arranged such that the PCB driver circuit can be operated from both AC and DC power supplies.

In a preferred embodiment the driver circuit is arranged to reduce or eliminate perceived flicker in the LED light source.

According to another aspect of the invention there is provided an LED lighting assembly comprising a cassette, a lens, a printed circuit board having at least one LED mounted thereon and wherein the LED lighting assembly further comprises a support having a light filter and wherein the light filter is applied to a light output from the LED for a predetermined period of time.

Optionally the light filter comprises a transparent support on which a temperature sensitive coating is applied. Preferably the transparent support comprises a film. In some preferred embodiments the temperature sensitive coating comprises an ink coating. In other embodiments the film may comprise a coating responsive to a voltage applied across the film. Desirably the ink coating is at least semi-opaque when the ink is below a preselected temperature. Preferably the ink coating becomes transparent as a temperature of the ink coating is raised. In a preferred embodiment the support is located in relation to the LED light source such that heat from the LED or conducting film raised the temperature of the support and ink coating after a period of time.

The ink coating may be applied across all of the support to provide a soft start to the lighting. In other embodiments a logo may be printed onto the support. Alternatively, a welcome message can be printed onto the support.

In some embodiments the ink coating may be thermochromic, and change colour as the temperature changes.

In other embodiments an electrochromic coating may be applied to the support. A voltage may be applied to the coating to control the colour and transparency of the support. Electrochromic coatings change colour when a small voltage is applied. A timer may be incorporated into the circuit applying a voltage to the electrochromic material in order to control the colour. A controller may also be arranged to control the voltage applied.

It will be appreciated that the different aspects of the invention may be used in isolation or may be used in a number of combinations of some or all of the aspects and features. An LED reading light may be provided having one or more of the described aspects or all of the described aspects.

FIG. 1 shows an LED lighting assembly 1 comprising a cassette 2, mounted in a globe shaped housing 4 within which a lens is located and, a printed circuit board (PCB) 6 on which is mounted an LED light source. The globe housing is mounted on a first side of the PCB. A heat sink 8 is mounted on the opposing side of the PCB. The PCB is adapted to be connectable to a passenger service unit (PSU) (not shown). The LED light assembly is a reading light assembly arranged to be used in a vehicle and particularly in an aeroplane. The LED reading light assembly can be retrofitted to an existing aeroplane in place of incandescent or halogen light bulbs. This will be described in more detail below.

The PCB is mountable in the PSU from a rear side of the PSU. The first side of the PCB 6 is arranged to be placed in a recess in which a conventional reading light in a PSU is received. The globe housing 4 is adapted to be the same size and shape as a housing on a conventional incandescent or halogen reading light.

An LED light source 9 is mounted on the first side of the PCB. In this embodiment the LED light source comprises 4 LED's 11 mounted on the PCB in two rows of the two.

Figure 2:
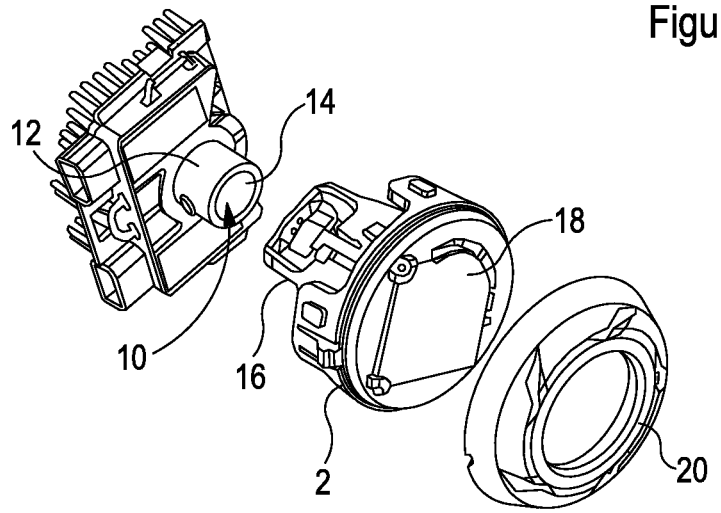
FIG. 2 is an exploded view of a portion of the LED light assembly.

FIG. 2 illustrates a portion of the LED light assembly. A portion of the PCB 6 and heat sink 8 is illustrated. In this embodiment four LEDs are mounted on the first side 10 of the PCB within a collimator 12. The collimator 12 comprises an optical cavity in the form of a longitudinally extending chamber. An inside surface 14 of the chamber has a reflective surface. The reflective surface may be a mirror film, a white reflective film or a polyester film.

Light passing into the collimator 12 from the LEDs mounted on the PCB mixes and generally becomes more linear as it passes along the collimator.

In one embodiment four LED light sources are mounted on the PCB. The LED light sources may comprise red, green, blue (RGB) or white bulbs. The light from the LEDs mixes as it travels along the collimator.

Power to the LEDs can be controlled so that the light is selected to be only red, green, blue, white or a mixture of colours. A selected colour can be used for mood lighting. It has been found that blue lighting can be used to create a calming atmosphere and the LEDs can be controlled to produce a blue lighting from the LED light assembly.

The cassette 2 is connected to a lens holder 16. A first portion of the cassette supports a protective screen 18 at a front of the cassette. A tamper resistant ring 20 is securable to a front side of the cassette 2.

The cassette is securable in the housing by means of a clip lock 22 adapted to be a push fit into the globe housing. Once the lock 22 has engaged in the globe housing the cassette is not readily removable. The clip lock 22 can be released with a suitable tool.

The clip lock 22 secures the cassette in place and can be removed if necessary. The lock can be released with a suitable tool in a single operation reducing the complexity of accessing the reading light and increasing a speed of changing the LED light assembly if replacement or repair is necessary.

Figure 3:
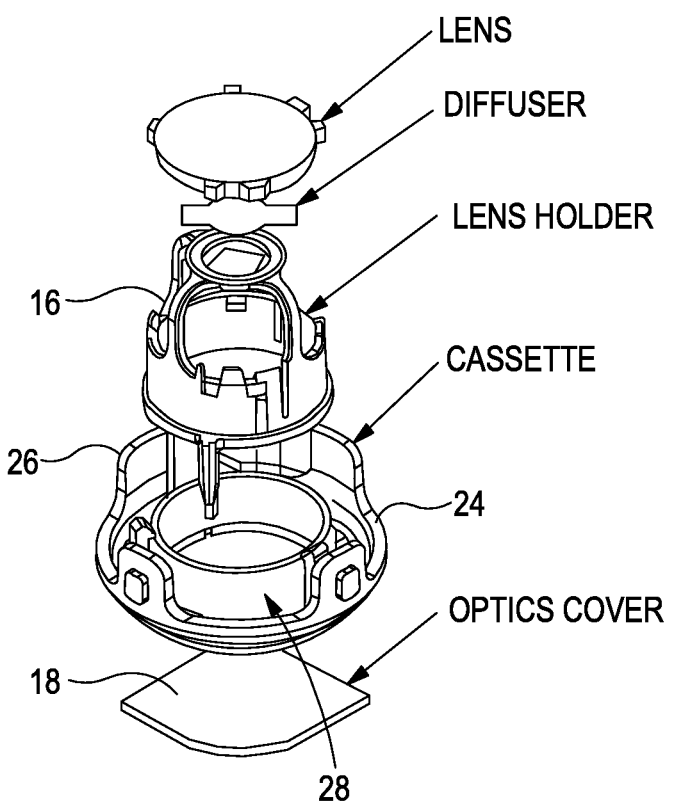
FIG. 3 is an exploded view of another portion of the LED light assembly, showing a cassette and lens holder.

An arrangement of the first portion of the LED light assembly is shown in more detail in FIG. 3. The cassette comprises an annular body 24 on a front portion of which the protective screen 18 is mounted. The annular body 24 of the cassette has a number of lugs 26 adapted to engage with corresponding portions 27 of the globe housing and to secure the cassette to the housing. A rear side 28 of the cassette is also arranged to receive the lens holder 16.

Figure 5:
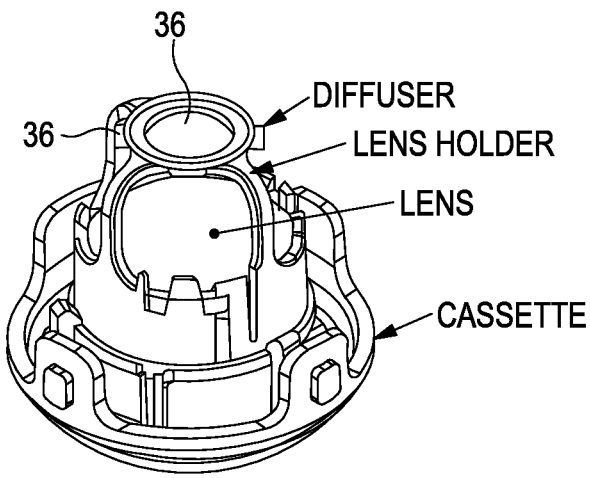
FIG. 5 is a view of the lens holder and cassette.
Figure 6:
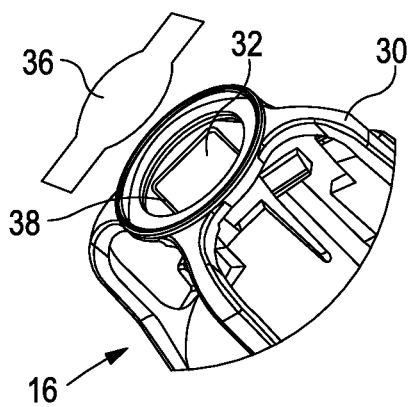
FIGS. 6 and 7 are enlarged views of the lens holder and aperture.
Figure 7:
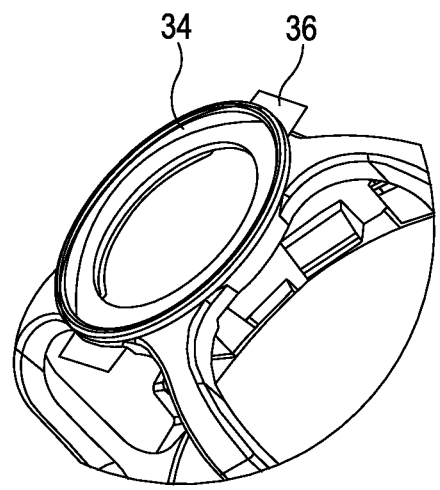

The lens holder 16 comprises a frame in the form of arms 30 supporting an aperture 32. The lens holder can be seen in more detail in FIGS. 5, 6 and 7. As can be seen most clearly in FIG. 6 the aperture 32 comprises a rectangle located in a ring 34 supported on the four arms 30. A diffuser 36 is securable on a rear side of the aperture 34.

The aperture 32 has a bevelled edge 38. Light from the collimator passes through the aperture 38 and a predetermined light pattern is shaped by the aperture. In this embodiment the aperture is substantially rectangular. A predetermined light pattern having a substantially rectangular form is produced by the aperture and is illustrated in FIG. 8.

It has been found that a defined light pattern having a sharp edge can induce a feeling of nausea in a passenger in an aeroplane. In flight a significant degree of vibration is experienced and this vibration causes a vibration of the edges of the predetermined light pattern.

Use of a bevelled edge to the aperture results in a softening and blurring of the edges of the predetermined light pattern. The edges of the predetermined light pattern are blurred such that the edges are not seen to vibrate by a passenger in the aeroplane, so improving the comfort of the passenger or passengers.

A focusing lens 40 or focusing lens assembly is mounted within the arms of the lens holder. The focusing lens assembly can be adjusted to focus the predetermined light pattern within a passenger space. The focusing lens assembly facilitates use of the LED light assembly in a variety of aeroplane models in which a distance from the PSU to the passenger space varies from one model of aeroplane to another.

In another embodiment a single focusing lens is used to focus the light pattern.

The focusing lens or focusing lens assembly is located remote from the LED bulbs and so the temperature of the lens is reduced. An advantage is that the reliability and life of the lens is improved compared to other LED lighting arrangements as the lens is kept at a lower temperature.

The lens holder 16 has a forwardly projecting arm 42 arranged to extend through a slot 44 in a front face 46 of the cassette. The slot 44 extends in an arc around a portion of the front face of the cassette. In this embodiment the slot extends around 90° of the circumference. A protective screen cover 18 is positioned over the front face of the cassette.

The arm 42 can be rotated within the slot 44 to orientate the aperture 32 such that the light pattern is orientated relative to the passenger space. Once the arm has been rotated such that the light pattern is correctly orientated relative to the passenger space then the tamper proof ring 20 can be connected to the front face of the cassette and secured in place. Once the tamper proof ring is secured in place the arm is fixed in place and the orientation of the light pattern is secured relative to the passenger space.

Figure 4:
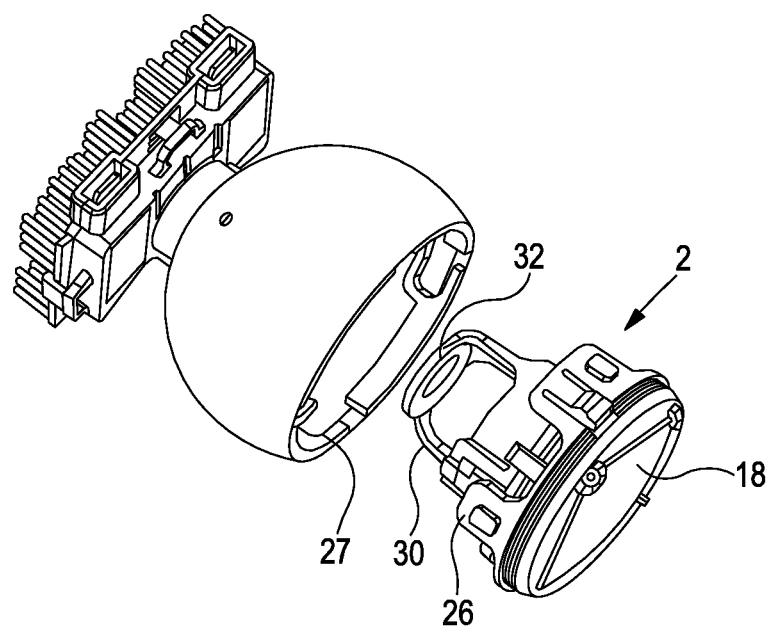
FIG. 4 is a view showing the cassette and lens holder arranged to be insertable into a housing of the LED light assembly.

As described above the cassette is secured to the globe by means of clip lock 22. An arrangement of the cassette and lens holder before insertion into the globe housing is illustrated in FIG. 4. An enlarged view of the clip lock 22 is shown in FIG. 11.

In some embodiments the diffuser is printed with a coloured ink as a plain colour or a logo or wording may be printed on the diffuser. The coloured ink can be temperature sensitive and can be arranged to become transparent as the ink is warmed over a period of time after the LEDs are turned on. The temperature sensitive ink may be used to create an initial lighting scheme or to provide a welcome message or house logo. In other embodiments the temperature sensitive ink may be printed on a separate support which can be a film or lens.

A method of retrofitting the LED light assembly to an aeroplane is described. A conventional incandescent or halogen reading light is removed. An electrical connector is removed from a rear of the PCB. The PCB of the LED reading light is fitted to a rear side of the PSU and can be readily fitted to the PSU. The four LED bulbs are on a front face of the PCB are mounted within a collimator on a first side of the PCB. A heat sink is provided on a second side of the PCB opposed to the first face. The collimator is arranged to project through an opening in the PSU and into a recess in which the conventional halogen or incandescent reading light has been mounted. The globe housing is mountable in the recess and over the collimator. The globe housing is connected to the PCB. The cassette and lens holder are inserted into the globe housing and the clip lock secures the cassette in the globe housing. The arm of the lens holder is rotated in the slot such that the aperture forms the predetermined light pattern in alignment with the passenger space.

A tamper proof ring is secured in place over the cassette preventing the arm from being further adjusted.

It will be appreciated that the LED lighting assembly may be used to replace conventional halogen or incandescent reading lights either as a complete retrofit or the replacement may be carried out on an ad hoc basis.

It will be further appreciated that the LED lighting assembly may be used as a new fitting as original new equipment. In such a case it may not be necessary to use the globe housing and other forms of housing can be envisaged. The PCB and LED bulbs may be utilised in different arrangements in a new fit out.

Figure 12:
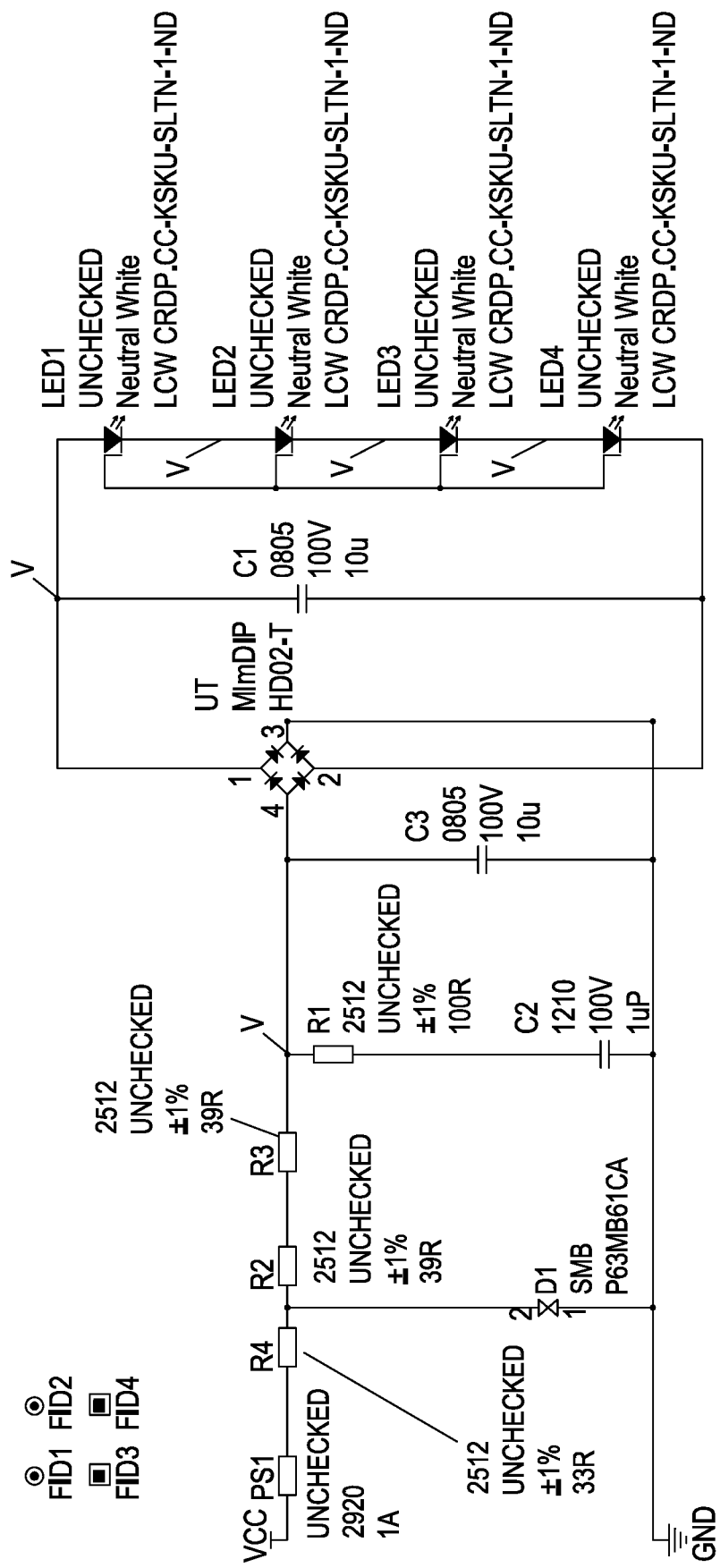
FIG. 12 is a schematic diagram of a driver circuit.

Another aspect of the invention will be described now in relation to the driver circuit used to control the LED lighting assembly as shown in FIG. 12. It has been found that the power used by an LED lighting assembly is much less than the power used by a lighting unit having an incandescent or halogen light bulb. A typical PSU has a controller which is arranged to cut off power to the PSU if the overall power or current used falls below a predetermined threshold level as described earlier The driver circuit is arranged such that the circuit simulates a power use which is greater than the actual power use. The power use simulated is greater than the threshold level and so the PSU controller does not cut off power to the PSU. The PCB driver incorporated a resistor or resistor/capacitor combination across the supply terminals to the lighting assembly. The PSU controller received an output from a trickle sensor indicating the presence of a bulb and maintains the PSU power supply in an ON condition.

The driver circuit is arranged to have a capacitor in parallel with the LED bulbs and applies an additional voltage across the LED when the AC voltage drops below a predetermined level. The capacitor is arranged to cut out when the current in the circuit reaches an upper threshold.

The driver circuit described is arranged such that the current supplied to the LED bulbs is maintained above a threshold level and the light level from the LED bulbs is held above a predetermined level. It will be appreciated that if the light level is maintained above a particular level then the passenger will not experience a flicker in the light levels of the LED lighting, so resulting in an improved passenger experience.

The invention claimed is:

1. An LED lighting assembly adapted to be insertable in an aircraft passenger service unit, the LED lighting assembly comprising:
   a cassette;
   a lens; and
   a printed circuit board (PCB) having at least one LED light source mounted thereon;
   wherein the lighting assembly comprises a driver circuit arranged to maintain conduction in the circuit, the PCB using a first amount of power;
   wherein the driver circuit is arranged to simulate use of a second amount of power, the second amount being lower than the first amount and wherein the driver circuit comprises a resistor and a capacitor configured to be connected across reading light supply terminals in the aircraft passenger service unit, the resistor and the capacitor being connected in series with each other and connected in parallel to the at least one LED light source.

2. The LED lighting assembly of claim 1 wherein the driver circuit is arranged to operate the LED lighting assembly from an AC or a DC supply.

3. The LED lighting assembly of claim 1 wherein the driver circuit is arranged to reduce or eliminate flicker from the LED light source.

4. The LED lighting assembly of claim 3 wherein the capacitor is arranged to be activated when a voltage across the driver circuit is below a first predetermined level.

5. An LED lighting assembly adapted to be insertable in an aircraft passenger service unit, the LED lighting assembly comprising; a printed circuit board (PCB) having at least one LED light source mounted thereon; wherein the lighting assembly comprises a driver circuit arranged to maintain conduction in the circuit, the PCB using a first amount of power; and wherein the driver circuit is arranged to simulate use of a second amount of power, the second amount being lower than the first amount and wherein the driver circuit comprises a resistor and a capacitor configured to be connected across reading light supply terminals in the aircraft passenger service unit, the resistor and the capacitor being connected in series with each other and connected in parallel to the at least one LED light source.

6. The LED lighting assembly of claim 5 wherein the driver circuit is arranged to reduce or eliminate flicker from the LED light source.

7. The LED lighting assembly of claim 6 wherein the capacitor is arranged to be activated when a voltage across the driver circuit is below a first predetermined level.

8. An LED lighting assembly adapted to be insertable in an aircraft passenger service unit, the LED lighting assembly comprising:
   a cassette;
   a lens;
   a printed circuit board (PCB) having at least one LED light source mounted thereon;
   wherein the lighting assembly comprises a driver circuit arranged to maintain conduction in the circuit, the PCB using a first amount of power;
   wherein the driver circuit is arranged to simulate use of a second amount of power, the second amount being lower than the first amount;
   wherein the driver circuit is arranged to simulate a higher and continuous power use than the first amount of power that is actually used when the LED light source is ON;
   wherein the driver circuit is arranged to reduce or eliminate flicker from the LED light source; and
   wherein the driver circuit comprises a capacitor and a resistor configured to be connected across reading light supply terminals in the aircraft passenger service unit, the resistor and the capacitor being connected in series with each other and connected in parallel to the at least one LED light source, and the capacitor arranged to be activated when a voltage across the driver circuit is below a first predetermined level.

* * * * *